United States Patent [19]
McKown, Jr.

[11] 3,769,665
[45] Nov. 6, 1973

[54] VARIABLE LENGTH TANGENTIAL WORM DRIVEN CLAMP

[75] Inventor: Howard P. McKown, Jr., Export, Pa.

[73] Assignee: Breeze Corporations, Inc., Union, N.J.

[22] Filed: Aug. 30, 1972

[21] Appl. No.: 284,777

[52] U.S. Cl. .............................................. 24/274 R
[51] Int. Cl. ............................................. B65d 63/02
[58] Field of Search ..................... 24/20 CW, 20 EE, 24/23 EE, 20 R, 201 A, 274, 280–284, 279, 19

[56] References Cited
UNITED STATES PATENTS
| | | | |
|---|---|---|---|
| 146,037 | 12/1873 | Weil | 24/23 EE |
| 249,909 | 11/1881 | Donahue | 24/23 EE X |
| 1,369,851 | 3/1921 | Swaidmark | 24/281 |
| 2,675,594 | 4/1954 | Dryden | 24/201 A |
| 3,475,793 | 11/1969 | Oetiker | 24/20 CW |
| 3,528,142 | 9/1970 | Lodholm | 24/274 R |

FOREIGN PATENTS OR APPLICATIONS
1,268,686  6/1961  France ............................. 24/274 R

*Primary Examiner*—Donald A. Griffin
*Attorney*—Albert F. Kronman

[57] ABSTRACT

A three part interlocking tangential worm driven clamp in which the desired size of the clamp is selectively formed by a length of band material having a series of spaced openings therein. A worm and housing unit is interlocked with one end of the band by means of the band openings and a slotted take up member is coupled to the opposite end of the band.

5 Claims, 11 Drawing Figures

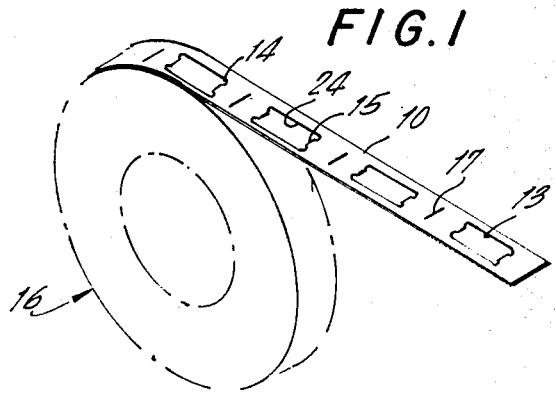
FIG. 1
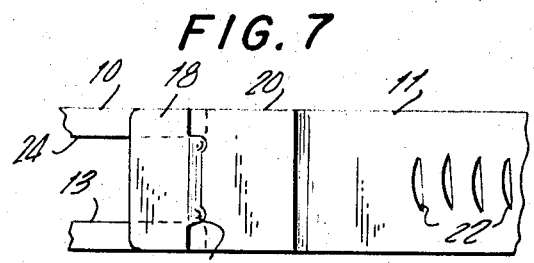
FIG. 7
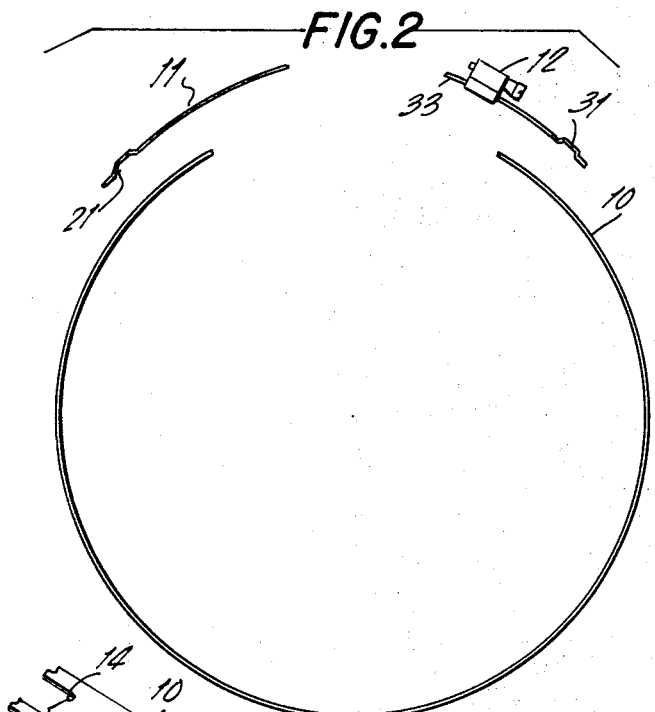
FIG. 2
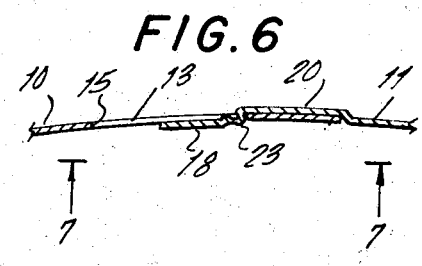
FIG. 6
FIG. 3
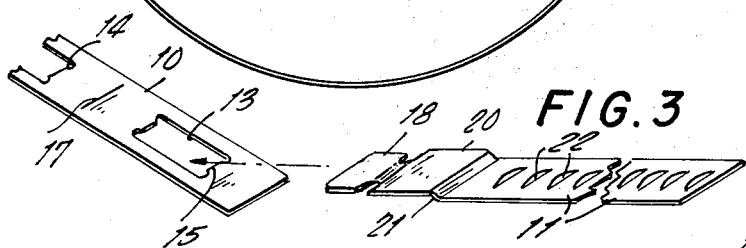
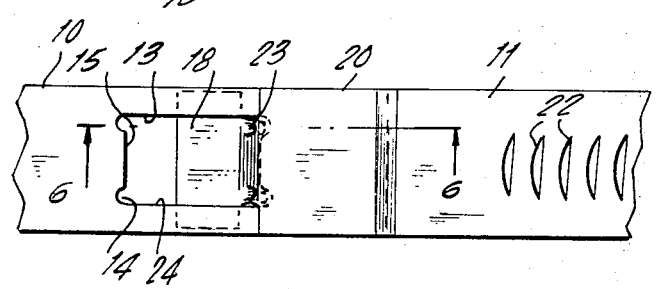
FIG. 5
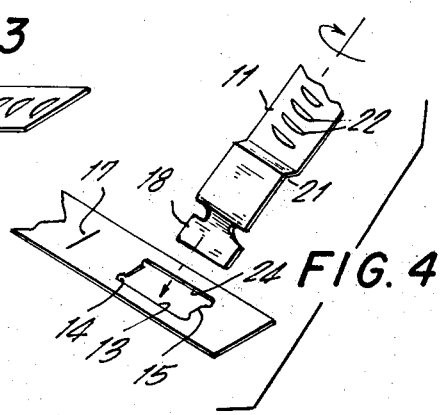
FIG. 4

VARIABLE LENGTH TANGENTIAL WORM DRIVEN CLAMP

BACKGROUND OF THE DISCLOSURE

It is well-known to provide clamping devices which can be assembled to a desired size consisting of elongated bands tightened at their ends by "T" bolts, screws, latches and other fastening devices. Certain of these prior art devices require specialized tools for assembly and application. Other known devices depend upon sharp folds in the interlocking members which greatly weaken the assembly. Once applied as a clamp, many prior art devices can only be released by the destruction of the band and tightening structures.

Accordingly, it is an object of the present invention to provide a tangential worm-driven clamping device in which the clamp size is variable over a wide range by the use of a standard metal cutting shear or snip.

Another object of the present invention is to provide a worm-driven clamp which can be accommodated to large objects of round, rectangular or irregular shape as desired.

A further object of the present invention is to provide a re-usable tangential worm-driven clamp of variable size which is easy to assemble and disassemble in the field.

An object of the present invention is to provide an interlocking structure for a three part worm-driven clamp which is easy to assemble and which does not substantially reduce the holding power of the clamp.

BRIEF DESCRIPTION OF THE DRAWINGS

In the following drawings forming part hereof, similar parts have been given the same reference numerals, in which drawings;

FIG. 1 is a somewhat isometric view, partly in phantom of a roll of band material according to the present invention, FIG. 2 is an exploded view in side elevation of a complete embodiment of the present invention, FIG. 3 is a fragmentary view of the end of the band material and one end of a slotted take up member according to the present invention, FIG. 4 is a somewhat exploded fragmentary view showing the manner in which the clamp elements are interlocked without the need of special tools, FIG. 5 is a top plan view of the members shown in FIG. 3 in an interlocked or assembled position, FIG. 6 is a cross-sectional view taken on line 5—5 in FIG. 5, FIG. 7 is a bottom plan view taken on line 7—7 of FIG. 6, with certain modifications of the take-up member.

SUMMARY OF THE DISCLOSURE

Figures 8, 9, 10, 11:
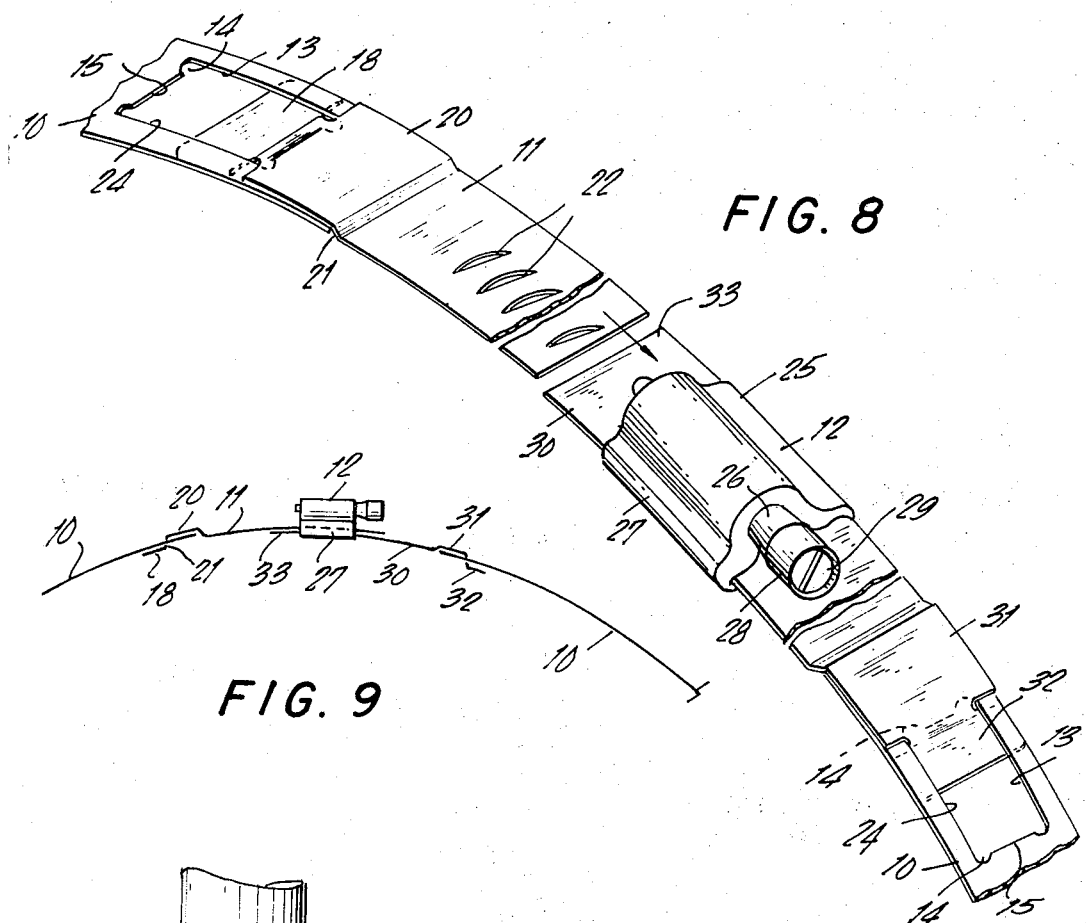
FIG. 8 is an isometric fragmentary view, somewhat enlarged, showing an assembled clamp according to the present invention.
FIG. 9 is a somewhat diagrammatic view of the assembled clamp shown in FIG. 8 on a reduced scale.
FIG. 10 is a top plan view of a clamp, made in accordance with the present invention, applied to a pipe.
FIG. 11 is a somewhat isometric view of the present clamp applied to a rectangular object.

In one preferred embodiment of the present invention a tangential worm-driven clamp is assembled by cutting a desired length of material from a continuous band. The band material is formed of metal and is provided with a series of spaced openings of a generally rectangular shape. A take-up member having a series of spaced transverse slots therein is coupled to one end of the band. A housing having a tightening worm therein is coupled to the opposite end of the band. The worm engages the slots of the take-up member to tighten the clamp assembly.

GENERAL DESCRIPTION

Referring to the drawings and particularly to FIGS. 1–5; the tangential worm-driven clamp according to the present invention consists of three interconnected members, a band 10, a take-up member 11 and a worm and housing unit 12. The band 10, as best shown in FIG. 1, comprises a continuous length of metal band material such as carbon steel, stainless steel or the like. Widths and thicknesses of the band 10 will depend upon the loads which the clamp is expected to bear. A suitable band material is stainless steel having a width of 0.500 inches and a thickness of 0.025 inch.

A series of rectangular openings 13, spaced from each other along the longitudinal axis of the band are provided as shown in FIG. 1. Each opening is somewhat longer than wide in shape and relieved at each corner by a small recess 14. A transverse projection 15 is thus formed between the recesses which extends inwardly at each end of the openings 13.

The band 10 is supplied in elongated rolls 16 and is cut to the desired length along a transverse guide marker 17 which is stamped into the surface of the band 10. The guide markers 17 are equally spaced along the band 10 so that band lengths can be measured off by counting the number of markers 17.

One end of the cut band 10 is engaged by a tab 18 formed by opposed recesses 19 cut into the sides of a take-up member 20. The take-up member is off-set as shown at 21 so that the bottom surface of the clamp forms as smooth a curve as possible. This smooth surface prevents damage to the object being held by the clamp. The remainder of the take-up member 20 is provided with a series of spaced transverse slots 22 for tightening purposes as hereinafter more fully described. The take-up member 20 is preferably made of the same flat material as the band 10 although it is possible to make the band wider without departing from the spirit of the invention.

Referring to the embodiment of FIGS. 6 and 7, it will be seen that the tab 18 is formed with a hemispheric embossing 23 at each side of the tab adjacent the recesses 19. The embossing 23 forms a bearing surface at the edges of the recesses 14 where the band 10 and the take-up member abut. This structure aids in aligning the members and prevents shearing of the coupling at this juncture.

In order to couple the end of the band 10 and the take-up member 20, the parts are placed in the position shown in FIG. 4. The tab 18 which is wider than the opening 13 is then inserted in the band opening 13 nearest the end of the band and rotated 90° until the edges 24 of the opening 13 slip into the recesses 19. The band 10 and the take-up member 20 are then longitudinally displaced until the tab 18 comes to rest against the end of the opening 13. The transverse projection 15 at the end of the opening 13 will form an interlock with the take-up member tab 18.

A worm and housing unit 12, best shown in FIGS. 8 and 9 completes the clamp. The worm 26, which is well-known in the worm driven hose clamp art and need not be further detailed, is freely journaled within a housing 27. One end of the worm 26 is headed at 28 and provided with a screw driver receiving slot 29 for clamp tightening purposes.

The housing 27 is secured to an elongated saddle 30, (as by welding or clamping), which extends beyond the housing 27 at each end thereof. The end of the saddle 30 nearest the worm head 28 is offset as shown at 31 in the manner set forth above and formed with a band engaging tab 32 similar in construction to the take-up tab 18. The tab 32 is coupled to the free end of the band 10 in the same manner as shown and described in FIG. 4.

The slotted end of the take-up member is brought into engagement with the worm 26 by sliding it over the extended portion 33 of the housing saddle 30 and directing it into the housing. As the worm 26 is rotated the assembled clamp is drawn tight.

As shown in FIGS. 10 and 11, clamps made according to the present invention can be accommodated to a wide variety of shapes as well as sizes. They can be assembled as needed and require only a metal shearing tool for complete assembly. If necessary the band can be severed at the desired length by rapid flexing along one of the guide markers 17. The worm and slot engagement is capable of imparting substantial torque and can be coupled and uncoupled repeatedly without clamp failure.

Having thus fully described the invention, what is claimed as new and desired to be secured by Letters Patents of the United States, is:

1. A tangential worm driven clamp comprising an elongated flat band having a plurality of spaced elongated rectangular openings therein, a take up member coupled to one end of said band, a first off-set tab having a width greater than the band opening width carried by the take up member received within one of the band openings to secure the take up member to the band, there being a plurality of spaced transverse slots in the take up member, a worm and housing unit coupled to the other end of the band, said worm and housing unit comprising an elongated saddle, a housing secured to the saddle, a worm freely journaled within the housing and a second off-set tab having a width greater than the band opening width carried by the saddle adjacent the end of the band and coupled thereto, said worm being adapted upon rotation to engage the slots of the take up member to tighten the clamp.

2. A clamp according to claim 1 in which the first and second tab are provided with opposed recesses for engagement with the edges of one of the band openings.

3. A clamp according to claim 2 in which the band openings are recessed at each corner to provide inwardly extending transverse projections at each end thereof.

4. A clamp according to claim 3 in which the first and second tab are provided with hemispheric embossings receivable within the band opening recesses in abutment with the edge thereof nearest the take up member and worm and housing unit respectively.

5. A clamp according to claim 1 in which the tabs are offset to lie in a substantially coplanar position with respect to the band.

* * * * *